United States Patent
Sheidler et al.

(10) Patent No.: US 6,468,153 B2
(45) Date of Patent: Oct. 22, 2002

(54) AIR BLAST DUCT FOR CLEANING AXIAL SEPARATOR

(75) Inventors: Alan David Sheidler, Moline; Rebecca Ann Frana-Guthrie, Coal Valley, both of IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/746,463

(22) Filed: Dec. 21, 2000

(65) Prior Publication Data

US 2002/0082062 A1 Jun. 27, 2002

(51) Int. Cl.[7] .................. A01F 12/48; B07B 1/50; B08B 5/00
(52) U.S. Cl. ............................... 460/100; 460/80
(58) Field of Search .................. 460/100, 99, 103, 460/80, 68, 117, 119; 56/202, 203, 194, 16.6

(56) References Cited

U.S. PATENT DOCUMENTS

| | | | |
|---|---|---|---|
| 1,848,252 A | * 3/1932 | Hermann | 460/117 |
| 3,370,794 A | * 2/1968 | Drewry et al. | 239/265.17 |
| 3,533,467 A | * 10/1970 | Rummel | 165/163 |
| 4,279,095 A | * 7/1981 | Aasen | 43/139 |
| 4,589,425 A | * 5/1986 | Mitchell, Jr. | 460/99 |
| 4,739,773 A | 4/1988 | West et al. | 130/27 R |
| 4,884,994 A | 12/1989 | Hall et al. | 460/66 |
| 4,906,262 A | 3/1990 | Nelson et al. | 55/290 |
| 5,088,960 A | 2/1992 | Stickler et al. | 460/80 |
| 5,832,708 A | * 11/1998 | Sugden | 56/202 |

FOREIGN PATENT DOCUMENTS

JP          10019354     * 1/1998    ............ F24F/13/02

* cited by examiner

*Primary Examiner*—Robert E. Pezzuto
*Assistant Examiner*—Árpád Fábián Kovács

(57) ABSTRACT

Duct work directing air from a combine cooling fan to the top of a separator unit, the duct work extending in an arc between its inlet and a flared outlet, and includes a neck portion that hinders air within the duct work from swirling upward in that location.

4 Claims, 5 Drawing Sheets

AIR BLAST DUCT FOR CLEANING AXIAL SEPARATOR

BACKGROUND OF THE INVENTION

The invention relates to ducts for routing engine cooling air to pneumatically blast dust, chaff and other debris off the top of an axial separator and associated drive mechanism.

In threshing a harvested crop, the grain is separated from straw and chaff and deposited into a holding tank. With conventional combines the harvested crop is directed to a transversely mounted threshing cylinder and concave, which threshes the crop, separating the grain from straw. The residue is then directed to a beater further separating the grain from straw. The straw residue is then passed over oscillating apertured straw walkers which direct the straw out of the back of the combine while allowing additional grain to fall through the apertures. Grain and chaff falling from the threshing concave and straw walkers is directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. Case International of Racine, Wis. currently markets and manufactures such a combine having a single rotor. Ford New Holland of New Holland, Pa. currently markets and manufactures this type of combine having a pair of rotors mounted side-by-side.

A hybrid machine having a transverse threshing cylinder and a pair of axial separating units is disclosed in U.S. Pat. No. 4,739,773, which is incorporated herein by reference. The axial separating units comprise cylindrical tubes having rotors housed therein. It has been found that dust, chaff and other debris collects on the top of the axial separating units.

It is known to provide an air duct that receives an air stream from a cooling system fan to blow debris off the top portion of an axial separator unit. Such ducts tend to block or hinder air from flowing through the cooling system and fan. It would be desirable to provide such a duct that minimizes or reduces the blockage of air flowing through the cooling system such that the cooling system can operate more effectively. Such ducts are typically positioned proximate the engine and therefore can obstruct an operator's access to the engine during maintenance procedures. It would be desirable to provide such a duct that is relatively small so that the obstruction to the engine is reduced. These ducts are designed to blow debris off the top of axial separator units, and therefore it would also be desirable for such a duct to provide an air stream with sufficient volume and velocity to effectively blow debris from that area.

SUMMARY OF THE INVENTION

The present invention is directed to using engine cooling air to pneumatically blast dust, chaff and other debris off the top of the axial separator units and the linkage that drives the rotors of the axial separator units. Duct work directs cooling air from the engine cooling system to the top of the axial separator and the rotor drive linkage. A deflector located above the separator divides the air into a forward component and a rearward component.

The duct work includes an arcuate conduit having an inlet proximate the engine cooling fan for receiving therefrom a generally horizontally travelling air stream. The conduit extends in an arc that gradually redirects this air stream generally vertically downwardly through the floor of a work platform and onto the top of the axial separator. As the air stream exits the conduit it strikes a flow divider that redirects the air into generally horizontal forward and rearwardly directed components. These air streams help clear debris off the top of the axial separator units and the drive linkage that drives the rotors of the axial separator units. The duct includes a neck portion that has a relatively small cross sectional area through which the air stream passes. This neck portion serves as a restriction that generally prevents the air stream from swirling upwardly in that location. Flow through the duct is thereby enhanced. The outlet of the duct flares outwardly from the neck portion to define a larger or expanded cross sectional area through which the air flow can pass, thereby further enhancing flow through the conduit.

DESCRIPTION OF THE PREFERRED EMBODIMENT

Figure 1:
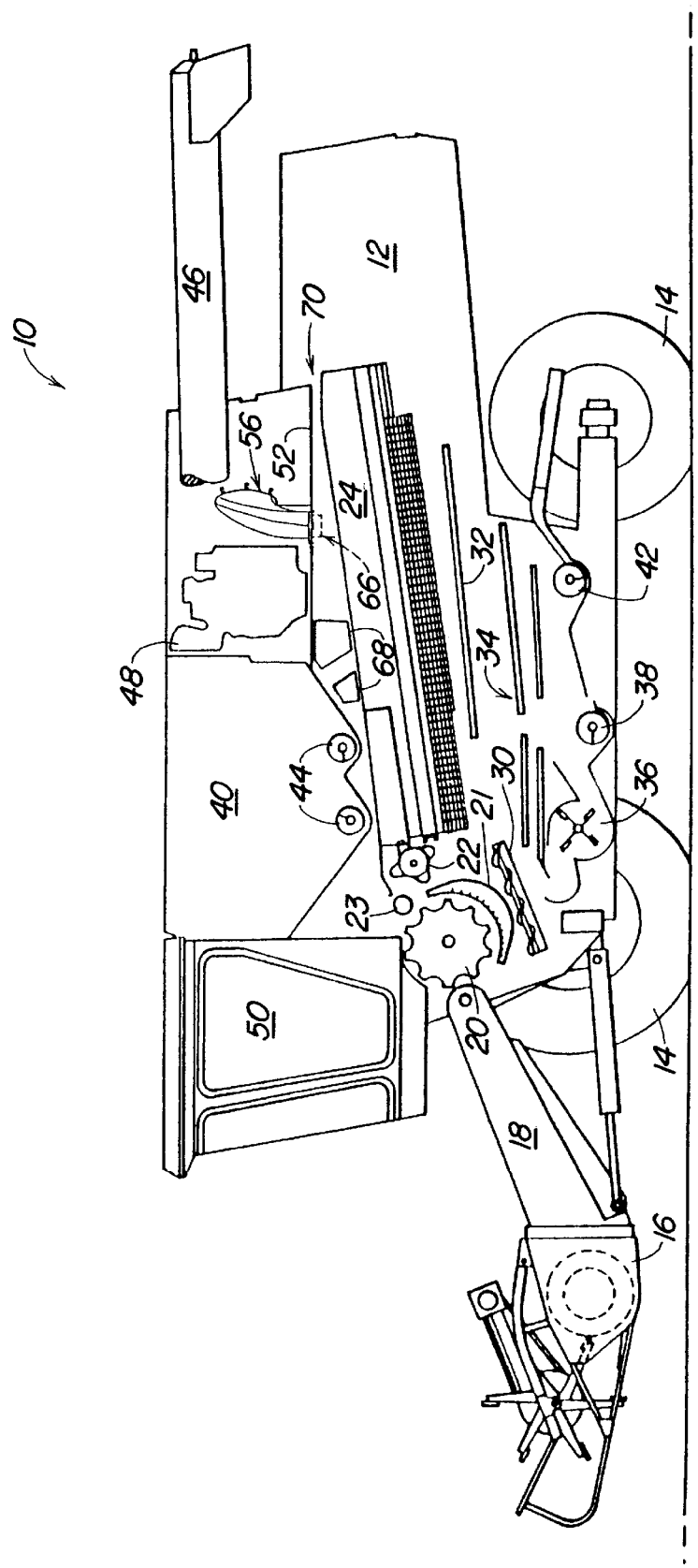
FIG. 1 is a semi-schematic side view of a combine having a transverse threshing cylinder and an axial separator.

FIG. 1 illustrates a self-propelled combine 10 having a supporting structure 12. The supporting structure is supported and propelled by ground engaging means comprising wheels 14. The ground engaging wheels 14 are driven by a propulsion means including an engine 48 for propelling the combine 10 across a field. The forward part of the combine 10 is provided with a harvesting platform 16 for harvesting a crop in a field and directing the harvested crop upwardly through a feederhouse 18 to the threshing and separating mechanism. The threshing and separating mechanism comprises a transverse threshing cylinder 20 and associated concave 21 to which the harvested crop is initially directed. The threshed crop is then directed to a stripping roller 23 and beater 22 from which it enters axial separator 24.

A similar axial separator is disclosed in U.S. Pat. No. 4,884,994 which is incorporated herein by reference. Such an axial separator comprises a pair of side-by-side cylindrical tubes. Each tube is provided with a rotor having fixed fingers or tines. Threshed crop material from the beater 22 is top fed into the tubes where it engages the rotors. The top inside surface of each tube is provided with vanes for driving the crop material rearwardly as the rotor tines throw the crop material upwardly to engage the vanes. The bottom of each tube is provided with grates through which grain and chaff fall onto shaker pan 32. Residue straw is discharged from the rear of the tubes.

Grain and chaff falling from the threshing and separating mean falls onto auger 30 and shaker pan 32 which direct the grain and chaff to cleaning shoe 34. The cleaning shoe is provided with a blower assembly 36 to assist in separating the grain from the chaff. Clean grain is driven by the clean grain cross auger 38 to an elevator (not shown) which directs the grain to grain tank 40. Tailings cross auger 42 directs unthreshed heads back to the threshing means through another elevator (not shown). Clean grain is unloaded from grain tank 40 through an unloading system comprising cross augers 44 and unloading auger 46.

All the various systems are driven by internal combustion engine 48 which is controlled by the operator from operator's cab 50. The threshing means, separating means and cleaning means are housed within the sidewalls of the supporting structure.

Figure 2:
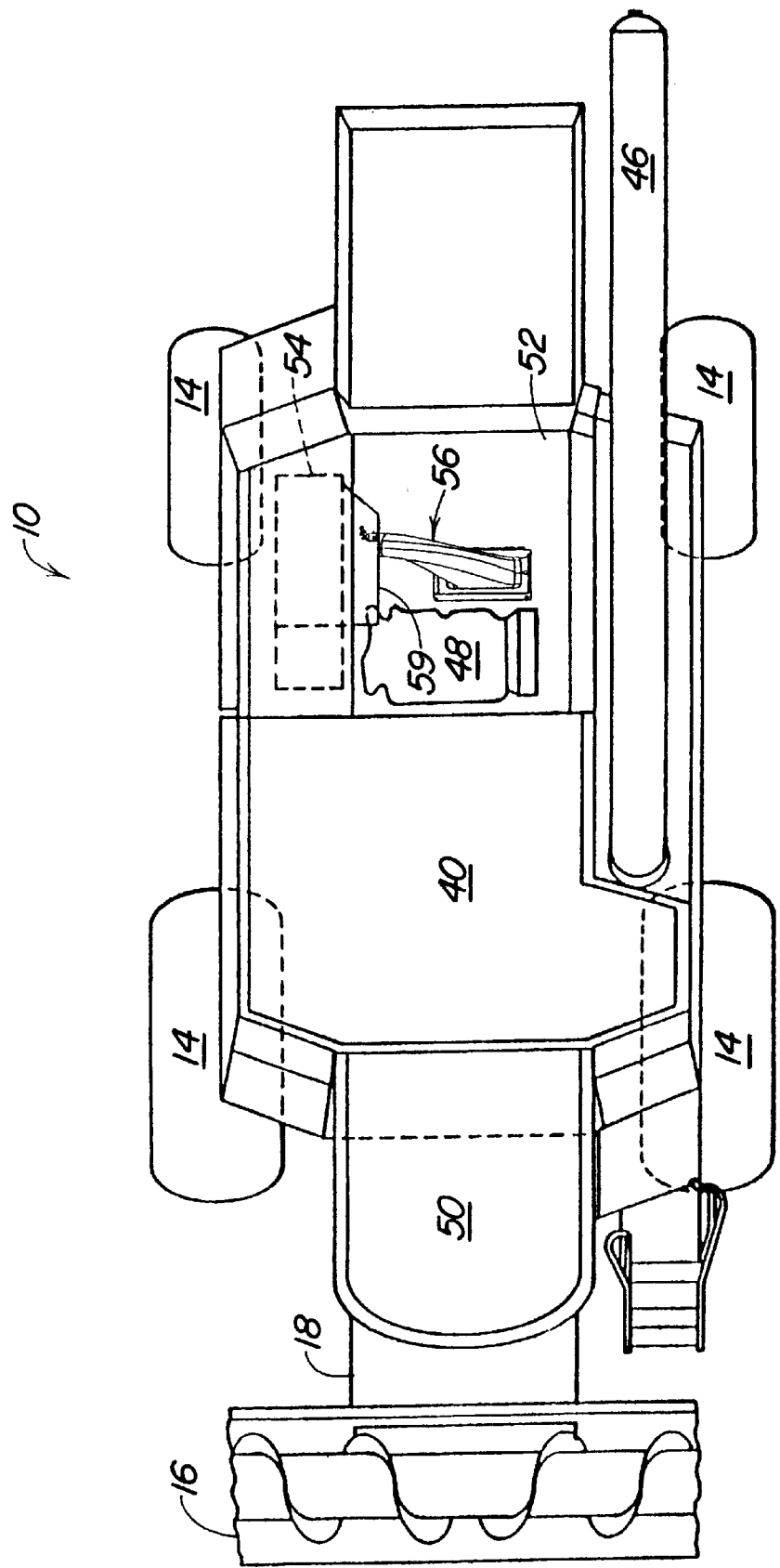
FIG. 2 is a semi-schematic top view of the combine.

As illustrated in FIG. 2, engine 48 is located on a work platform 52 located to the rear of grain tank 40. The work platform 52 is used to service the engine 48. The engine cooling system comprising a cooling fan, a radiator, charged air cooler, oil coolers, fuel cooler, condenser, and a self cleaning rotary screen are located at 54. Such a cooling system is shown in U.S. Pat. No. 4,906,262, which is incorporated herein by reference.

Figure 3:
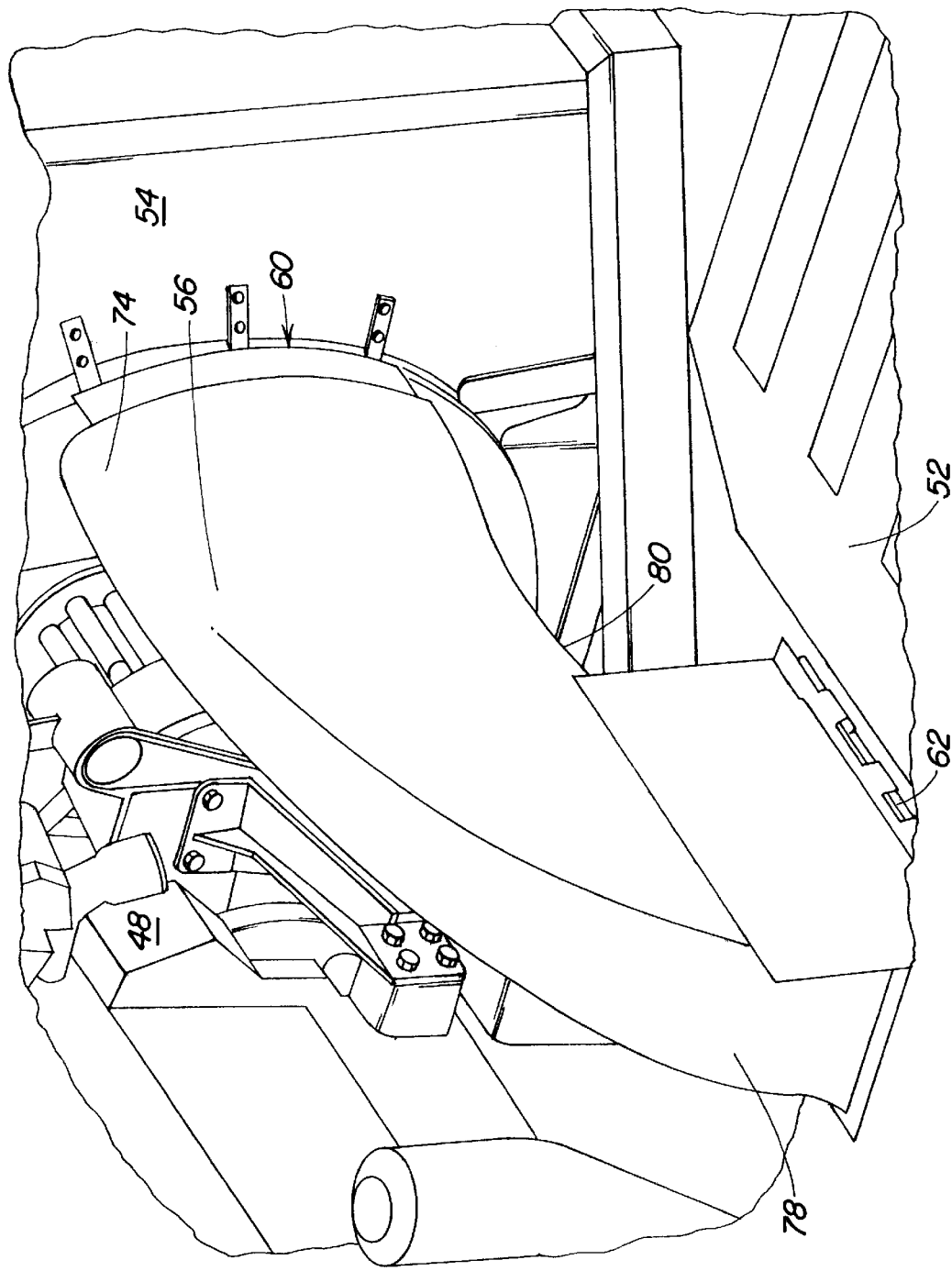
FIG. 3 is a perspective view of the duct work in place within a combine.
Figure 5:
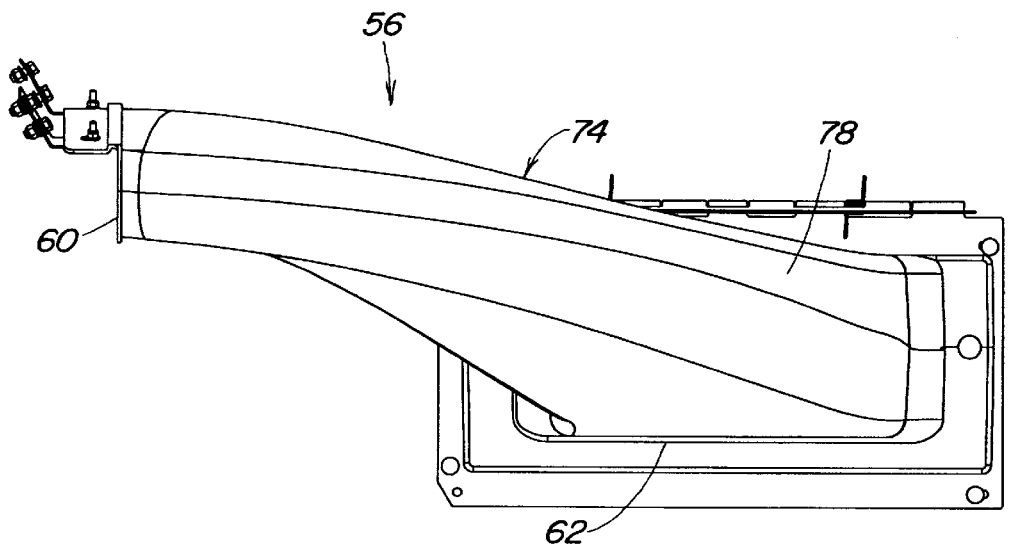
FIG. 5 is a top view of the duct work.
Figure 4:
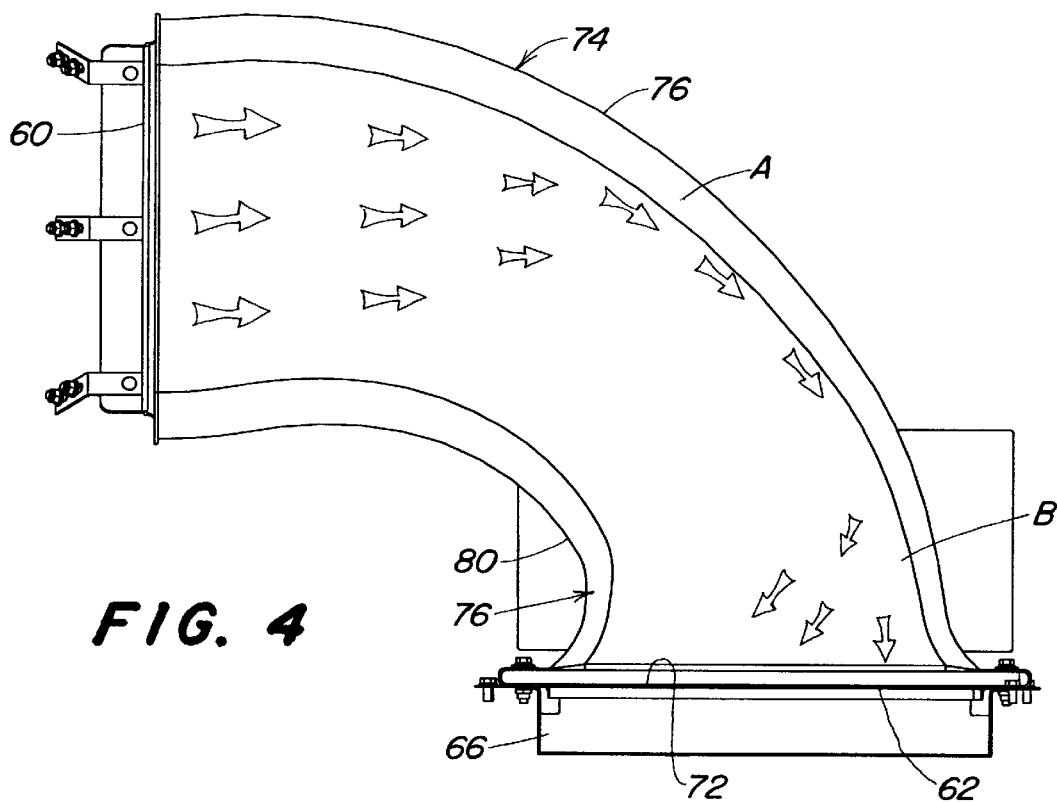
FIG. 4 is a view of the duct work.
Figure 6:
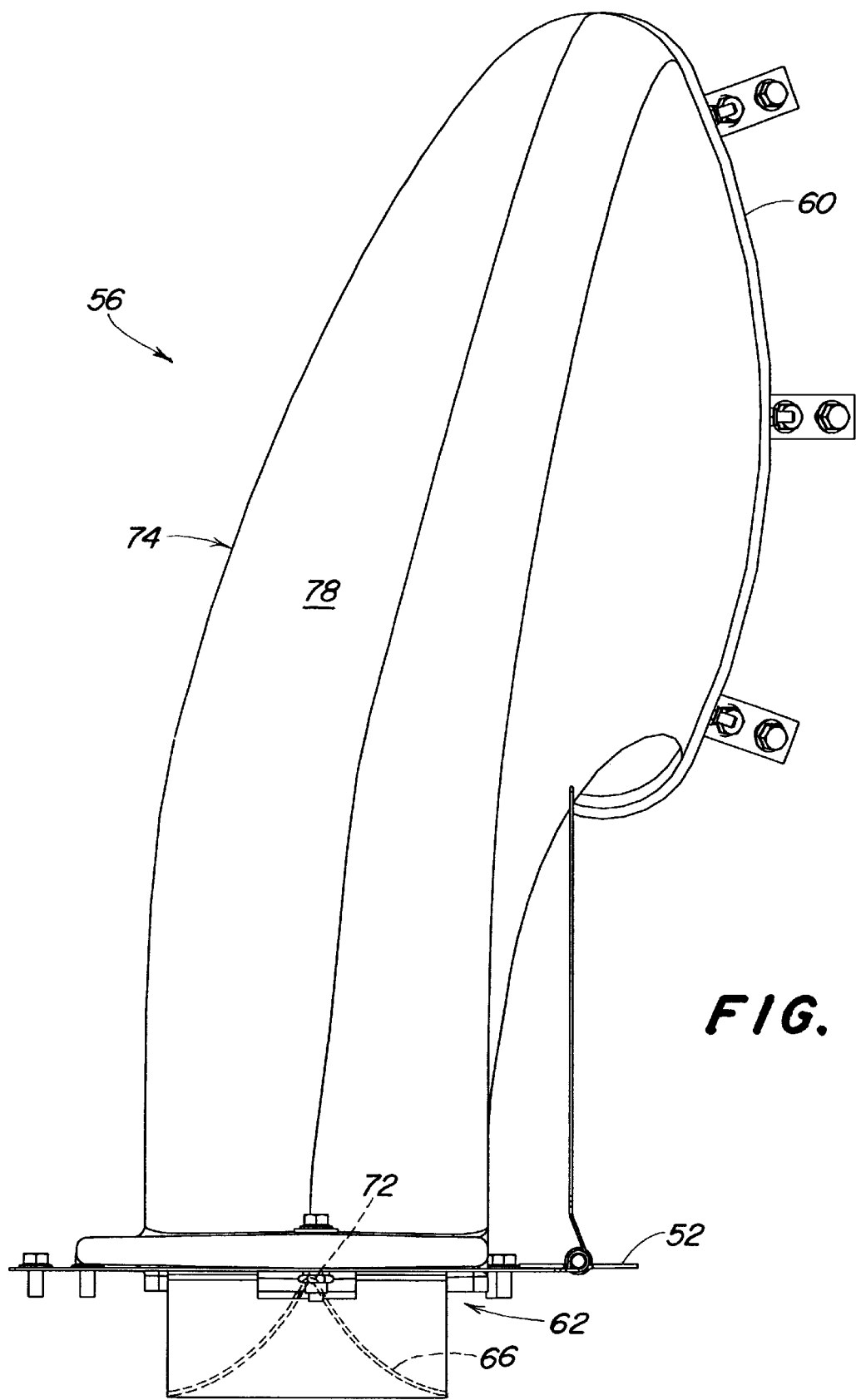
FIG. 6 is a view of the duct work showing in phantom a deflector positioned at the outlet of the conduit.

Duct work 56 for intercepting a portion of the cooling air stream is located behind the engine 48 and pneumatically downstream of the engine cooling fan. The duct work 56 is best illustrated in FIGS. 3, 4 and 5. As cooling air is drawn by the cooling fan through the heat exchangers and rotary screen it forms a transverse horizontal air stream. Most of this horizontal air stream is directed to the engine 48 by shroud 59, however, a portion of this air stream is intercepted by inlet 60 of the duct work 56. The structure of the duct work 56 changes the direction of the air stream so that it flows vertically downward towards the axial separators 24.

The air is expelled from the duct work 56 through duct work outlet 62 which is aligned with an opening located in the work platform 54. As the now vertically downward air stream is directed through outlet 62 it encounters deflector 66. Air deflector 66 divides the air stream into two components, a forward component and a rearward component. The air deflector changes the direction of the air stream from a vertically downward air stream into a substantially horizontal axial air stream having forward and rearward components which serve to blow debris from the top of the separator units 24.

The forward and rearward components of the horizontal axial air stream prevents dust and other debris from accumulating on top of the axial separators 24 and their drive linkages. Forward exhaust openings 68 can be formed in the side walls of the supporting structure. These openings 68 can vent the forward space located between the deflector 66 and the openings 68. Dust and chaff can be expelled from the combine 10 through these apertures 68. Exhaust gap 70 can be formed between the bottom of the work platform 54 and rear top portion of the axial separator units 24. This gap 70 can be used for venting the rearward space between the deflector 66 and the rear portion of the axial separator units 24.

The vertex 72 of the deflector 66 is positioned to force some air exiting the duct 56 forwardly and some air rearwardly. The deflector 66 is designed and positioned to force a large quantity of air forward as the exhaust openings 68 are pneumatically more inefficient than exhaust gap 70 as the airflow must make a perpendicular turn to escape through the sidewalls. Less air flow is needed to the rear, as the transverse gap 70 is better aligned with the air flow across the top of the separator 24.

The duct work 56 includes a roto-molded polyethylene conduit 74 that extends in an arc between its inlet 60 and outlet 62. The curve of the arced conduit 74 gradually redirects the air stream therein from a horizontal direction of travel to a vertical direction of travel. This gradual redirection of air helps minimize the velocity drop that may occur as the air stream is redirected. The conduit 74 includes a neck portion 76 proximate the location at which the air stream begins traveling vertically. A large portion of the air stream within the conduit 74 is located proximate the curved wall 78 of the conduit at point A. As the air flow in this location is redirected by curved wall 78 downwardly to a vertical flow path near point B the air may begin to spread out away from the curved wall 78 and toward opposite wall 80. If the air stream in this location is allowed to spread out enough it may tend to swirl in an upward direction within the conduit 74 in this location. However, the presence of the neck portion 76 establishes a restriction in this particular location that will generally block the air from swirling upwardly at that location. As the air in that area begins to spread out from the curved wall 78 of the conduit 74 it will strike the opposite wall 80 defined at the location of the neck portion 76 before it can swirl upwardly. The air that strikes the opposite wall 80 will continue to travel downwardly within the conduit 74 toward the outlet 62. The spreading air flow in this general location tends to strike the opposite wall 80 before the air achieves an upward trajectory, and will therefore tend to strike the opposite wall 80 with a downward trajectory and continue travelling downwardly after striking the opposite wall 80. If the air stream were allowed to swirl back upwardly within the conduit 74 the swirling air would hinder airflow through the conduit 74, thereby decreasing the duct's ability to blow debris from the top of the separator units 24.

The outlet 62 of the conduit flares outwardly from the neck portion 76 to form a trumpet-like shape, thereby establishing a larger cross sectional area than the neck portion 76. This allows the air stream to easily exit the conduit 74 with little resistance, thereby enhancing the flow through the conduit 74.

The conduit 74 is designed to provide a relatively small structure adjacent the cooling fan. A smaller conduit decreases the blockage of air through the cooling system. This allows air to more freely flow through the cooling system, thereby enhancing the effectiveness of the cooling system. Also, a relatively small structure adjacent the engine 48 will create less obstruction to an operator performing maintenance such as engine oil level checks. By designing the conduit 74 to have enhanced flow through the conduit 74, the conduit 74 can be sized relatively small, thereby creating less of a hinderance to airflow through the cooling system and fan, and establishing a smaller obstruction to engine maintenance. The conduit 74 is also positioned relatively close to the fan, such that less blowout from the inlet occurs that might otherwise hinder the flow of air through the cooling system and fan. Positioning the conduit 74 close to the fan also allows the conduit 74 to receive faster moving air from the fan, thereby serving to increase the speed of the airflow through the conduit 74, which will more effectively blow debris from the tops of the separator units 24, and therefore a smaller conduit 74 can be provided. The inlet 60 is positioned at the outer radial edge portion of the fan to receive an airstream from the fan having a relatively high velocity.

The invention should not be limited by the above-described embodiment, but should be limited solely to the claims that follow.

What is claimed is:

1. An agricultural combine for harvesting a crop from a field, for threshing and separating the grain contained in that crop from straw and chaff, the combine comprising:

a supporting structure having ground engaging wheels which support and propel the supporting structure;

an axial separating unit that extends longitudinally within the supporting structure for separating the grain contained in a harvested and threshed crop from straw;

a fan located on the supporting structure and which forms an air stream; and duct work for directing the air stream to a top of the axial separator unit for blowing debris therefrom, said duct work further comprising a clear conduit having an inlet which receives generally horizontally travelling air from said fan, and an outlet which directs said air generally vertically downwardly, the duct having a neck portion proximate to and above the outlet, said neck portion establishing a restriction to flow of air within the conduit for hindering air from swirling upwardly proximate the neck.

2. An agricultural combine for harvesting a crop from a field, for threshing and separating the grain contained in that crop from straw and chaff, the combine comprising:

a supporting structure having ground engaging wheels which support and propel the supporting structure;

an axial separating unit that extends longitudinally within the supporting structure for separating the grain contained in a harvested and threshed crop from straw;

a fan located on the supporting structure and which forms an air stream;

duct work for directing the air stream to a top of the axial separator unit for blowing debris therefrom, said duct work further comprising a clear conduit having an inlet which receives generally horizontally travelling air from said fan, and an outlet which directs said air generally vertically downwardly, the duct having a neck portion proximate to and above the outlet, said neck portion establishing a restriction to flow of air within the conduit for hindering air from swirling upwardly proximate the neck, and said outlet flares outwardly from the neck portion and establishes a larger cross sectional area than the neck portion of the conduit.

3. An agricultural combine for harvesting a crop from a field, for threshing and separating the grain contained in that crop from straw and chaff, the combine comprising:

a supporting structure having ground engaging wheels which support and propel the supporting structure;

an axial separating unit that extends longitudinally within the supporting structure for separating the grain contained in a harvested and threshed crop from straw;

a fan located on the supporting structure and which forms an air stream;

duct work for directing the air stream to a top of the axial separator unit for blowing debris therefrom, said duct work further comprising a clear conduit having an inlet which receives generally horizontally travelling air from said fan, and an outlet which directs said air generally vertically downwardly, the duct having a neck portion above the outlet, said neck portion establishing a restriction to flow of air within the conduit for hindering air from swirling upwardly proximate the neck, and said conduit extends in an arc between the inlet and the outlet.

4. An agricultural combine for harvesting a crop from a field, for threshing and separating the grain contained in that crop from straw and chaff, the combine comprising:

a supporting structure having ground engaging wheels which support and propel the supporting structure;

an axial separating unit that extends longitudinally within the supporting structure for separating the grain contained in a harvested and threshed crop from straw;

a fan located on the supporting structure and which forms an air stream;

duct work for directing the air stream to a top of the axial separator unit for blowing debris therefrom, said duct work further comprising a clear conduit having an inlet which receives generally horizontally travelling air from said fan, and an outlet which directs said air generally vertically downwardly, the duct having a neck portion above the outlet, said neck portion establishing a restriction to flow of air within the conduit for hindering air from swirling upwardly proximate the neck, said conduit extending in an arc between the inlet and the outlet; and said outlet flares outward from the neck portion and establishes a larger cross sectional area than the neck portion of the conduit.

\* \* \* \* \*